(12) United States Patent
Kelly

(10) Patent No.: US 7,399,183 B1
(45) Date of Patent: Jul. 15, 2008

(54) BICYCLE COMBAT SIMULATOR

(76) Inventor: Michael C. Kelly, 120 Keating Dr., Winchester, VA (US) 22601-2800

( * ) Notice: Subject to any disclaimer, the term of this patent is extended or adjusted under 35 U.S.C. 154(b) by 536 days.

(21) Appl. No.: 11/041,501

(22) Filed: Jan. 24, 2005

Related U.S. Application Data

(60) Provisional application No. 60/538,411, filed on Jan. 22, 2004.

(51) Int. Cl.
*G09B 19/00* (2006.01)

(52) U.S. Cl. ....................................... 434/247

(58) Field of Classification Search ................... 434/11, 434/16, 19, 22, 247; 446/440; 463/49–54, 463/56, 57; 273/371, 373, 378–381; 280/288, 280/4, 828; D12/107, 108, 111, 114, 116, D12/117, 126

See application file for complete search history.

(56) References Cited

U.S. PATENT DOCUMENTS

| | | | | |
|---|---|---|---|---|
| 1,562,244 | A | | 11/1925 | Morrill, Jr. |
| D164,067 | S | | 7/1951 | Sebel ............................ D34/15 |
| D177,915 | S | * | 6/1956 | Kalt ............................ D12/108 |
| 2,761,689 | A | | 9/1956 | Becker ....................... 280/1.21 |
| 2,793,045 | A | | 5/1957 | Schuler ....................... 280/1.21 |
| 3,017,193 | A | * | 1/1962 | Klein ......................... 280/1.14 |
| 3,117,798 | A | * | 1/1964 | Young ........................ 280/1.12 |
| 3,151,872 | A | | 10/1964 | Weber, Sr. .................. 280/1.11 |
| 3,832,791 | A | * | 9/1974 | Robertsson ................... 434/22 |
| 3,916,536 | A | * | 11/1975 | Mohon et al. .................. 434/21 |
| 4,361,338 | A | | 11/1982 | Kuchenbecker et al. ..... 280/1.11 |
| 4,938,483 | A | * | 7/1990 | Yavetz ............................ 463/5 |
| 5,022,666 | A | * | 6/1991 | Simon ........................ 280/1.16 |
| 5,314,207 | A | | 5/1994 | Camfield et al. ............ 280/1.11 |
| 5,499,835 | A | * | 3/1996 | Skirchak et al. .............. 280/293 |
| 5,785,592 | A | * | 7/1998 | Jacobsen ......................... 463/7 |
| 5,947,738 | A | * | 9/1999 | Muehle et al. ................. 434/16 |
| 6,220,965 | B1 | * | 4/2001 | Hanna et al. ................... 463/52 |
| 6,910,703 | B1 | * | 6/2005 | Hamilton ................... 280/288.4 |
| 6,949,003 | B2 | * | 9/2005 | Hornsby et al. .............. 446/484 |
| D515,469 | S | * | 2/2006 | Lu ............................. D12/108 |
| 2004/0033472 | A1 | * | 2/2004 | Varshneya .................... 434/23 |
| 2004/0087377 | A1 | * | 5/2004 | Liu ............................... 463/51 |
| 2004/0219491 | A1 | * | 11/2004 | Shlomo ........................ 434/11 |
| 2005/0016515 | A1 | * | 1/2005 | Arnaud ......................... 124/56 |

* cited by examiner

*Primary Examiner*—Kurt Fernstrom
(74) *Attorney, Agent, or Firm*—Steptoe & Johnson PLLC

(57) ABSTRACT

An apparatus including a bicycle having a top tube, a frame connected to the bicycle, and a combat vehicle simulator interchangeably connected to the frame. A laser tag system including a laser tag gun and a sensor also preferably is connected either to the bicycle or the frame. The laser tag gun preferably is mounted on the front of the frame facing forward and the sensor is mounted on the back of the frame facing rearward. The frame includes an elongated member having a front end and a back end, and extending lengthwise along the bicycle; a first generally U-shaped section connected to the front end of the elongated member; and a second generally U-shaped section connected to the back end of the elongated member.

22 Claims, 3 Drawing Sheets

BICYCLE COMBAT SIMULATOR

CROSS REFERENCE TO RELATED APPLICATIONS

This application claims priority to U.S. provisional application No. 60/538,411 filed Jan. 22, 2004.

BACKGROUND OF THE INVENTION

1. Field of Invention

The present invention relates to land vehicles, and more particularly to occupant- or rider-propelled land vehicles.

2. Related Art

The bicycle is referred to by some as the greatest invention. Unfortunately as our modern society tends toward a more sedentary lifestyle, we utilize the greatest invention less and less, and instead are mind-numbingly entertained by computers and video games. The result of our increased fondness of electronic entertainment and the corresponding decrease in physical activity is a society plagued by both adult and childhood obesity. In addition to our waning physical condition, our intellect is likewise being diminished by hours upon hours in front of the television.

There exist tricycles which have adapted for use therewith simulated airplane and motorcycle parts. These simulated parts however are designed only for use with tricycles and as such are cumbersome and prevent skilled technical riding of a bicycle if used in conjunction therewith. Thus, there is a need for a device that encourages active play while at the same time stimulates the intellect. More specifically, there is a need for an invention that on the one hand encourages young people to get out and be active by riding their bicycles, and on the other hand simultaneously ignites a desire from within for a deeper understanding about world and/or American history.

SUMMARY OF THE INVENTION

The present invention simulates aerial warfare using bicycles as movement stands for two-dimensional aircraft models and laser tag air-to-air/golf ball air-to-ground simulated combat systems. This invention transforms miniature aircraft gaming to a larger scale with an emphasis on real-world skills, tactical acumen and personal physical involvement in the game by providing a means for actually engaging and defeating an opposing player or players with the use of a laser tag system. A golf ball dispenser also can be used to bomb targets placed on the ground. By using different means for dispensing the golf ball "bombs," play can simulate dive-bombing, torpedo bombing and level bombing. The present invention readily lends itself to individual or group play with historical scenarios, campaigns, role-playing and the like; aerial warfare re-enacting becomes a possibility. With little modification, players can engage in futuristic inter-galactic space battle as well.

The bicycle combat simulator includes a two-dimensional representation of a combat vehicle, preferably an historical aircraft, viewed from both the right and left side and constructed of readily available, light-weight materials, and painted appropriately. The simulator sides are easily mounted to and dismounted from a frame attached to a bicycle with "U" bolts. The frame allows the simulator to be held safely away from the handlebars and the rider, while providing an enclosed "feel". Neither the frame nor the two-dimensional simulator sides adds significantly to wind resistance or to the weight of the bicycle, thereby avoiding excessive physical demands on the rider/player. The design allows for easy mounting/dismounting of the bicycle and for walking the bicycle when needed.

A laser tag system, preferably including an eye-safe infrared light projector, is attached to the frame, with a sensor mounted on the rear of the bicycle. The use of reflecting tape on the frame as a deflector allows for "head-on" shooting without additional sensors. A simple reflecting system allows for a single laser tag gun to be used for both fire to the front and, if appropriate to the aircraft, fire to either beam, flank or quarter. Fire directly to the rear is obstructed by the rider/player and the bicycle itself, thereby simulating the "blind spot" directly behind or below many real aircraft. The laser tag system presently in use is a current product, suitably modified, which allows for limited "ammunition" and variable "damage" settings appropriate for the model aircraft represented. When a sufficient number of "hits" has been recorded by the sensor, the rider/player's laser tag system sounds an alarm, and the system can not function without being reset. This simulates the player being "shot down."

The invention also can be used for simulating an air-to-ground combat system. The best playing area for the air-to-ground combat system is a parking lot, school yard, or other location with a relatively smooth surface. The "bombing" system of the bicycle combat simulator is a simple golf ball dispenser which applies direction to the ball, while the speed of the bicycle determines the velocity of the ball and its distance. The target is a two-dimensional silhouette of a ship, vehicle, building, etc., with a frame designed to retain a ball that strikes the target. In "dive-bombing," "torpedo-bombing," or "level-bombing," a minimum distance to the target can be set which simulates either AAA or minimum dive-recovery altitude. The player must gauge his or her speed, the release distance, the condition of the "playing surface," e.g., real winds, and target attitude prior to releasing the "bomb," so as to hit the target, keep the "bomb" within the confines of the target frame, and "pull out" before encroaching on the minimum distance. The "damage" caused to the target by a hit is determined by differing colors for each type/weight of "ordnance" carried by the aircraft. Put simply, the system simulates in two-dimensions the movement of a real aircraft and its ordnance in three dimensions. Level bombing consists of moving parallel to a target(s) and releasing an appropriate number of "bombs" from the dispenser turned 90 degrees to the direction of movement of the aircraft.

The bicycle combat simulator readily lends itself to more sophisticated representations of actual flight and combat. For example, the simulator also could include means for communicating between players/teams, minimum and maximum speeds for a particular aircraft ("stall", "maximum level speed" and "maximum dive speed"), turn radii at differing speeds, abstract altitude representations, fuel limitations, appropriate sounds, differing armament configurations and damage scoring. Scenario-specific items can include equipment for photo-reconnaissance, abstract artillery spotting, drop tanks, etc. The targets can be configured with laser tag sensors to respond to "strafing" attacks and "balloon-busting" missions.

One aspect of the invention is a bicycle combat simulator including a bicycle, a frame connected to the bicycle, and a combat vehicle simulator connected to the frame.

Another aspect of the invention is a bicycle combat simulator including a bicycle, a frame connected to the bicycle, a combat vehicle simulator connected to the frame, and a laser tag system connected to the bicycle, the frame, or the combat vehicle simulator, wherein the frame includes an elongated member having a front and a back, a first generally U-shaped member connected to the front of the elongated member; and a second generally U-shaped member connected to the back of the elongated member.

Another aspect of the invention is a method of making an apparatus including a bicycle, a frame connected to the bicycle, a combat vehicle simulator connected to the frame, and a laser tag system connected to the bicycle, the frame, or the combat vehicle simulator including: connecting an elongated member of the frame to a top tube of the bicycle; connecting a first generally U-shaped member to a front of the frame; connecting a second generally U-shaped member to a back of the frame; connecting a first two-dimensional representation of a combat vehicle to a first side of the first and second generally U-shaped members; connecting a second two-dimensional representation of a combat vehicle to a second side of the first and second generally U-shaped members; mounting a laser tag gun on the frame facing forward; and mounting a laser tag sensor on the frame or the bicycle facing rearward.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

EMBODIMENTS OF THE INVENTION

Figure 1:
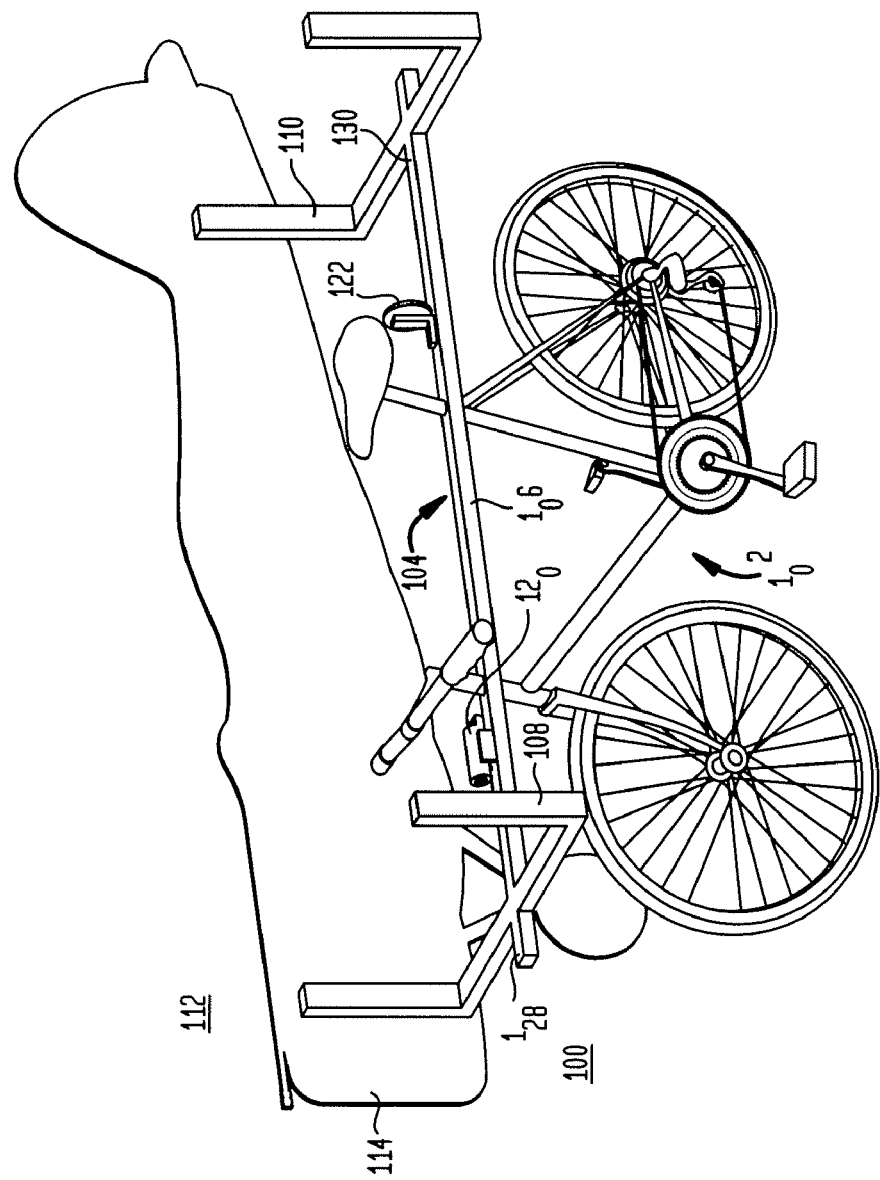
FIG. 1 is a side elevation view of an embodiment of the present invention.
Figure 2:
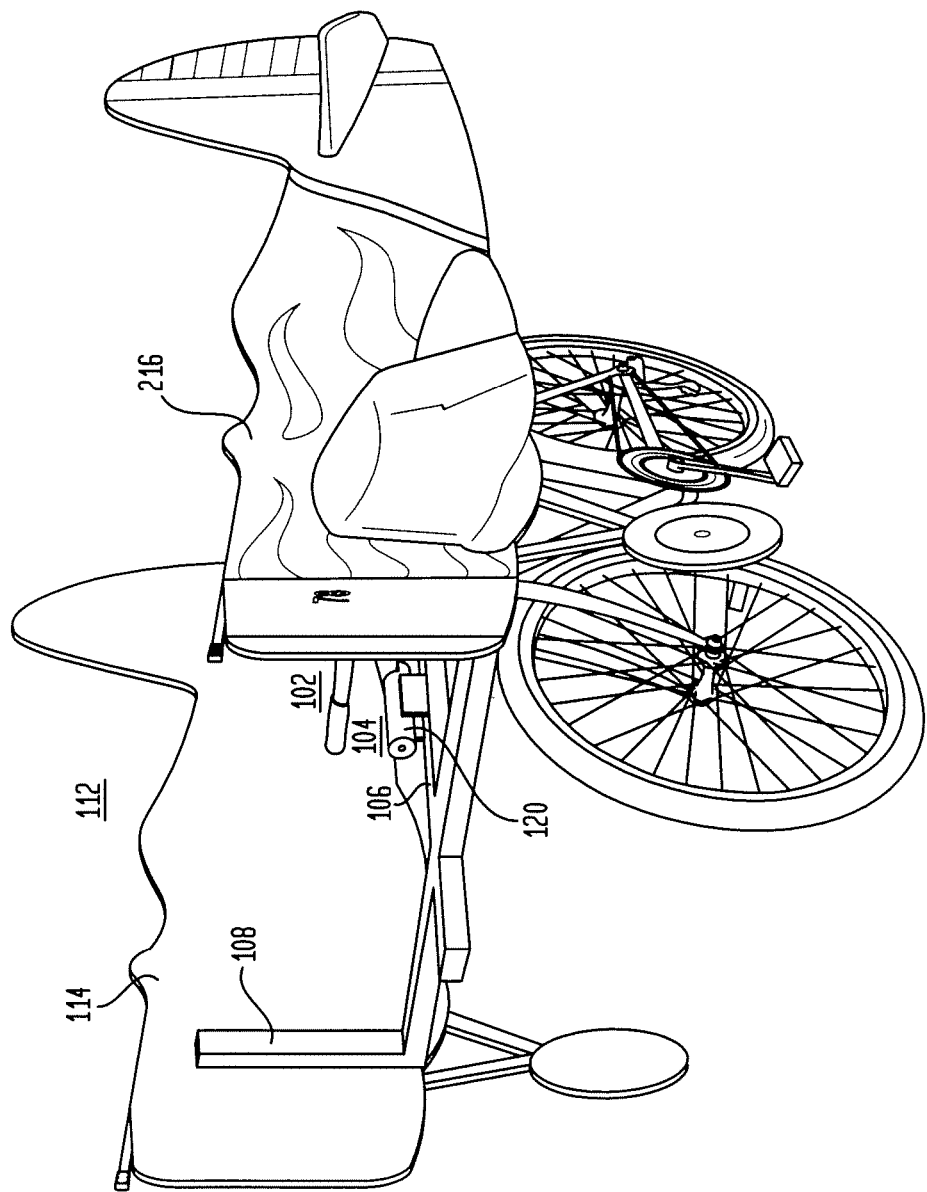
FIG. 2 is a front view of the front of an embodiment of the present invention.
Figure 3:
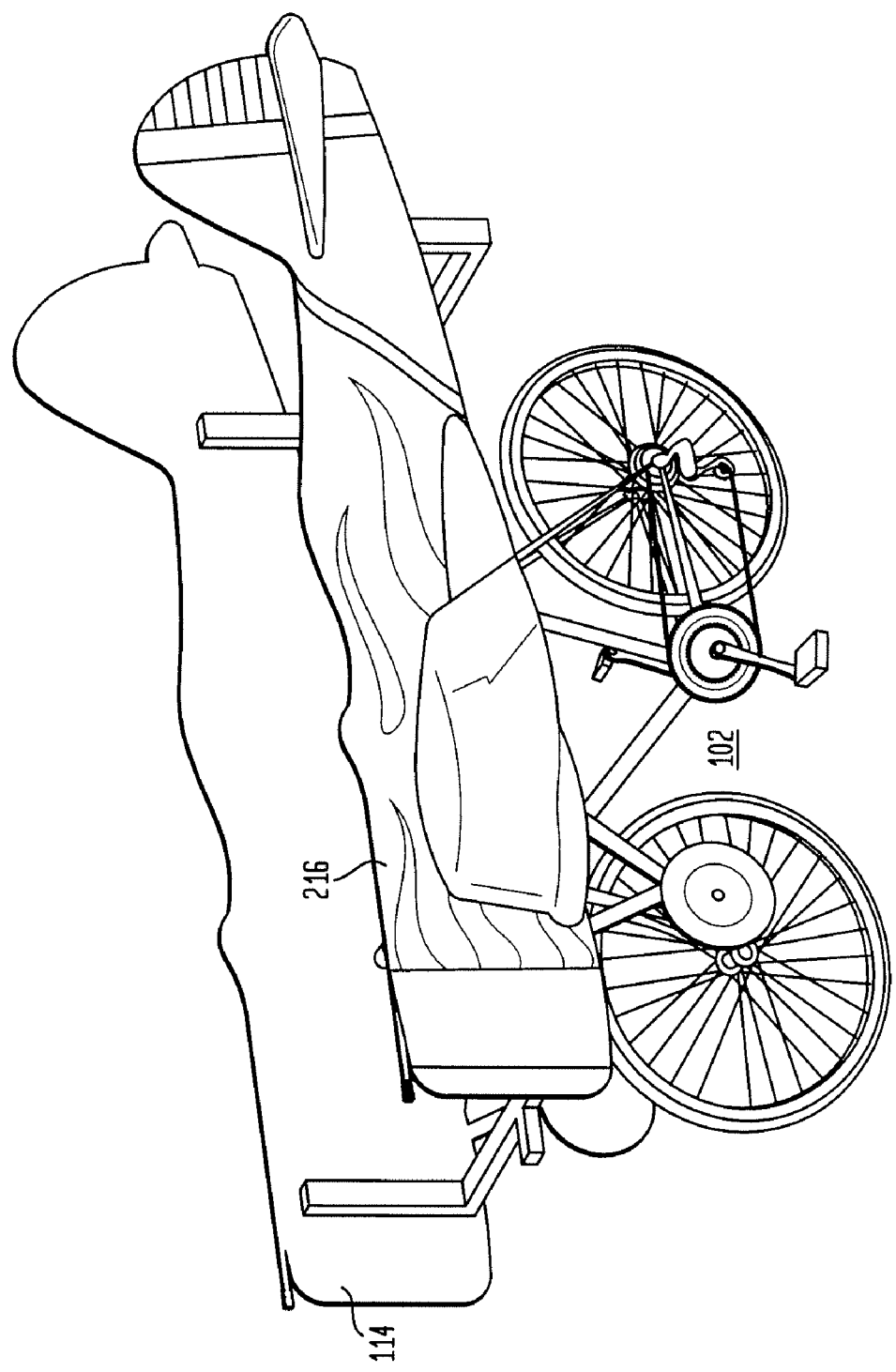
FIG. 3 is a side view of an embodiment of the present invention.

An embodiment of a bicycle combat simulator (BCS) 100 is shown generally at FIGS. 1-3. Referring to FIG. 1, the BCS 100 can include a bicycle 102 or other wheeled land vehicle, such as a moped, motorcycle, all-terrain vehicle (ATV), or scooter. Bicycles are distinguished from motorized vehicles such as motorcycles or mopeds because bicycles are rider-propelled. In that respect, a bicycle is a non-motorized rider-propelled vehicle. Non-limiting examples of bicycles with which the BCS 100 can be used include road bikes, mountain bikes, hybrids, cyclocross bikes, unicycles, tricycles, tandems, and recumbents. While a conventional mountain bike is preferred because of its popularity and the relatively upright position of the rider while riding, other bicycle types can be used depending on the preference of each individual rider. Motorized vehicles such as mopeds and bicycles can alternatively be used, but bicycles are preferred because they are rider-propelled and therefore require physical exertion on the part of a rider and thereby improve the fitness of the rider with use.

The BCS 100 includes a frame 104 adapted for use with a bicycle 102. The frame 104 preferably has an elongated member 106 with a front 128 and a back 130. A first generally U-shaped member 108 is connected to the front 128 of the elongated member 106, and a second generally U-shaped member 110 is connected to the back 130 of the elongated member 106. The first and second U-shaped members 108, 110 can be connected to the elongated member 106 by clamps, fasteners, welds, male-female connectors, or other means known to those skilled in the art. Non-limiting examples of materials from which the frame 104 can be made include wood, metal, aluminum, stainless steel, titanium, carbon fiber, plastic, PVC tubing, synthetic polymers, and alloys and composites thereof. In a presently preferred embodiment, the frame 104 is made of PVC tubing and has a generally round or circular cross-section.

The frame 104 can be used to secure the BCS 100 to a bicycle 102. For example, the bicycle 102 preferably includes a top tube that extends between the head tube and the seat tube of the bicycle 102. The elongated member 106 of the frame 104 can be positioned alongside the top tube of the bicycle 102 and connected thereto. The elongated member 106 of the frame 104 can be connected to the top tube of the bicycle 102 with clamps, such as C-clamps, fasteners, welds, male-female connectors, or other means known to those skilled in the art. The elongated member 106 preferably extends along the entire length of the bicycle 102 such that the first U-shaped member 108 of the frame 104 is positioned in front of the handlebars on the bicycle 102 and the second U-shaped member 110 of the frame 104 is positioned behind the rear tire on the bicycle 102. The lateral surface of each upright portion of the first and second U-shaped members 108, 110 can be used for receiving a combat vehicle simulator 112.

The combat vehicle simulator (simulator) 112 can include a first side 114 and a second side 216, each of which can be attached to the frame 104. In a presently preferred embodiment, the first side 114 of the simulator 112 is connected to a lateral surface of the first and second U-shaped members 108, 110 and the second side 216 of the simulator 112 is connected to the opposite lateral surface of the first and second U-shaped members 108, 110.

Referring to FIG. 3, the first and second sides 114, 216 of the simulator 112 are generally two-dimensional representations of a combat vehicle. Combat vehicle can include, without limitation, airplanes, tanks, ships, submarines, and hummers and other military transport vehicles. The first and second sides 114, 216 of the simulator 112 preferably include one or more female connectors that align with one or more male connectors on the frame 104. In order to access the cockpit of the simulator 112, i.e., the seat of the bicycle 102, an end—preferably an end near the back of the bicycle 102— of one of the sides 114, 216 of the simulator 112 can be disconnected from the frame 104 thereby creating an opening. For example, the back end of the first side 114 of the simulator 112 can be pulled away from the frame 104 such that a female connector on the first side 114 is disengaged from a male connector on the frame 104. The first side 114 of the simulator 112 can then be rotated either clockwise or counterclockwise to create access to the seat of the bicycle 102. The first side 114 of the simulator 112 can be re-connected to the frame 104 by rotating the first side 114 in the direction opposite of the direction in which it was previously rotated and aligning and securing the male connector on the frame 104 to the female connector on the first side 114 of the simulator 112. Similarly, one simulator can be replaced with another by detaching the first and second sides 114, 216 of a first simulator 112 from the male connectors on the frame 104 and securing the male connectors on the frame 104 to female connectors on the first and second sides 114, 216 of a second simulator 112. Thus, simply by replacing the first and second sides 114, 216, a single bicycle 102 can be used to simulate the appearance of a variety of different combat vehicles.

The bicycle combat simulator 100 also can include a laser tag system 118. The laser tag system 118 can include a laser gun 120 and a sensor 122. The laser gun 120 can be connected to either the frame 104 or the bicycle 102. In a preferred embodiment, the laser gun 120 preferably is connected to the frame 104 at or near the front 128 of the elongated member 106. The laser gun 120 can be connected to the elongated member 106 by nails, screws, double-sticky back tape, staples, brackets, loop and hook fasteners, or other means known to those skilled in the art. A sensor 122 also can be connected to the frame 104 at or near the back 130 of the elongated member 106. The sensor 122 likewise can be connected to the elongated member 106 by nails, screws, double-sticky back tape, staples, brackets, loop and hook fasteners, or other means known to those skilled in the art. The laser tag system 118 can include one or more deflectors connected to the bicycle or the frame for directing a beam from a laser tag gun on a competitor's combat vehicle simulator into a sensor 122.

In operation, the combat vehicle simulator 100 can be used to enhance the joy of riding a bicycle and add a new dimension to laser tag by simulating aerial warfare using bicycles as movement stands for two-dimensional aircraft models and laser tag air-to-air/golf ball air-to-ground simulated combat systems. As with laser tag in general, the object is to "kill" the competition by repeatedly shooting his or her sensor with a laser tag gun. With the present invention, that is accomplished when two or more players each have a bicycle 102 having mounted thereto a bicycle combat simulator 112 including a frame 104 connected to the bicycle 102, a combat vehicle simulator 112 connected to the frame 104, and a laser tag system 118 with a laser tag gun 120 and a sensor 122. The object is for a player to ride his or her bicycle 102 such that the laser tag gun 120 mounted thereto is aligned with the sensor 122 on the bicycle 102 of a second player. The first player then shoots his or her laser tag gun 120 which transmits a beam either directly or indirectly to the sensor 122 on the bicycle 102 of a second player. A hit is direct if the beam travels straight from a laser tag fun 120 into a sensor 122, whereas a hit is indirect if the beam is re-routed into the sensor 122 via a deflector 124.

CONCLUSION

While various embodiments of the present invention have been described above, it should be understood that they have been presented by way of example only, and not limitation. It will be understood by those skilled in the art that various changes in form and details may be made therein without departing from the spirit and scope of the invention. Thus, the breadth and scope of the invention should not be limited by any of the above-described exemplary embodiments.

What is claimed is:

1. An apparatus comprising:
   a bicycle;
   a frame connected to said bicycle;
   a combat vehicle simulator connected to said frame; wherein said frame comprises:
      an elongated member having a front and a back;
      a first generally U-shaped member connected to the front of said elongated member; and
      a second generally U-shaped member connected to the back of said elongated member.

2. The apparatus of claim 1, wherein said bicycle comprises a top tube, and said elongated member is connected to and extends along said top tube of said bicycle.

3. The apparatus of claim 1, wherein said combat vehicle simulator is detachably connected to said bicycle.

4. The apparatus of claim 1, wherein said combat vehicle simulator comprises:
   a first two-dimensional representation of a combat vehicle; and
   a second two-dimensional representation of a combat vehicle.

5. The apparatus of claim 4, wherein said first two-dimensional representation of a combat vehicle is connected to a first side of said first and second generally U-shaped members, and said second two-dimensional representation of a combat vehicle is connected to a second side of said first and second generally U-shaped members.

6. The apparatus of claim 5, wherein the first and second two-dimensional representations of a combat vehicle each have a length about equal to or greater than that of said bicycle.

7. The apparatus of claim 1, wherein said combat vehicle simulator is chosen from airplanes, ships, tanks, submarines, or helicopters.

8. An apparatus, comprising:
   a bicycle;
   a frame connected to said bicycle;
   a combat vehicle simulator connected to said frame; and
   a laser tag system connected to said bicycle, said frame, or said combat vehicle simulator; wherein said frame comprises:
      an elongated member having a front and a back;
      a first generally U-shaped member connected to the front of said elongated member; and
      a second generally U-shaped member connected to the back of said elongated member.

9. The apparatus of claim 8, wherein said bicycle comprises a top tube, and said elongated member is connected to and extends along said top tube of said bicycle.

10. The apparatus of claim 8, wherein said combat vehicle simulator is detachably connected to said frame.

11. The apparatus of claim 8, wherein said combat vehicle simulator comprises:
   a first two-dimensional representation of a combat vehicle; and
   a second two-dimensional representation of a combat vehicle.

12. The apparatus of claim 11, wherein said first two-dimensional representation of a combat vehicle is connected to a first side of said first and second generally U-shaped members, and said second two-dimensional representation of a combat vehicle is connected to a second side of said first and second generally U-shaped members.

13. The apparatus of claim 12, wherein the first and second two-dimensional representations of a combat vehicle each have a length about equal to or greater than that of said bicycle.

14. The apparatus of claim 8, wherein said combat vehicle simulator is chosen from airplanes, ships, tanks, submarines, or helicopters.

15. The apparatus of claim 8, wherein said laser tag system comprises a laser tag gun and a sensor.

16. The apparatus of claim 15, wherein said laser tag system further comprises a deflector for directing a beam from a laser tag gun to a sensor.

17. The apparatus of claim 15, wherein said laser tag gun is mounted on said frame facing forward and said sensor is mounted on said frame or said bicycle facing rearward.

18. A method of making an apparatus comprising a bicycle, a frame connected to said bicycle, a combat vehicle simulator connected to said frame, and a laser tag system connected to said bicycle, said frame, or said combat vehicle simulator, comprising:
   connecting an elongated member of said frame to a top tube of said bicycle;

connecting a first generally U-shaped member to a front of said frame;
connecting a second generally U-shaped member to a back of said frame;
connecting a first two-dimensional representation of a combat vehicle to a first side of said first and second generally U-shaped members;
connecting a second two-dimensional representation of a combat vehicle to a second side of said first and second generally U-shaped members;
mounting a laser tag gun on said frame facing forward; and
mounting a laser tag sensor on said frame or said bicycle facing rearward.

19. The apparatus of claim 1, further comprising a laser tag system connected to said bicycle, said frame, or said combat vehicle simulator.

20. The apparatus of claim 19, wherein said laser tag system comprises a laser tag gun and a sensor.

21. The apparatus of claim 20, wherein said laser tag system further comprises a deflector for directing a beam from a laser tag gun to a sensor.

22. The apparatus of claim 20, wherein said laser tag gun is mounted on said frame facing forward and said sensor is mounted on said frame or said bicycle facing rearward.

* * * * *